(12) United States Patent
Wu et al.

(10) Patent No.: US 12,378,391 B2
(45) Date of Patent: Aug. 5, 2025

(54) OIL-EXTENDED PELLET FORM ETHYLENE ALPHA-OLEFIN DIENE INTERPOLYMERS FOR THERMOPLASTIC VULCANIZATES

(71) Applicant: Dow Global Technologies LLC, Midland, MI (US)

(72) Inventors: Xiaosong Wu, Lake Jackson, TX (US); Colin Li Pi Shan, Lake Jackson, TX (US); Tao Han, Shanghai (CN); Libo Du, Shanghai (CN)

(73) Assignee: Dow Global Technologies LLC, Midland, MI (US)

(*) Notice: Subject to any disclaimer, the term of this patent is extended or adjusted under 35 U.S.C. 154(b) by 898 days.

(21) Appl. No.: 17/599,964

(22) PCT Filed: Mar. 29, 2019

(86) PCT No.: PCT/CN2019/080377
§ 371 (c)(1),
(2) Date: Sep. 29, 2021

(87) PCT Pub. No.: WO2020/198918
PCT Pub. Date: Oct. 8, 2020

(65) Prior Publication Data
US 2022/0169841 A1  Jun. 2, 2022

(51) Int. Cl.
*C08L 23/16* (2006.01)
*C08L 23/06* (2006.01)

(52) U.S. Cl.
CPC .............. *C08L 23/06* (2013.01); *C08L 23/16* (2013.01)

(58) Field of Classification Search
CPC ....................................................... C08L 23/16
See application file for complete search history.

(56) References Cited

U.S. PATENT DOCUMENTS

| | | |
|---|---|---|
| 3,037,954 A | 6/1962 | Gessler et al. |
| 3,284,421 A | 11/1966 | Breslow |
| 3,287,440 A | 11/1966 | Giller et al. |
| 3,297,674 A | 1/1967 | Breslow et al. |
| 3,709,840 A | 1/1973 | Dehoff |
| 3,806,558 A | 4/1974 | Fischer |
| 3,963,679 A | 6/1976 | Ullrich et al. |
| 4,104,210 A | 8/1978 | Coran et al. |
| 4,116,914 A | 9/1978 | Coran et al. |
| 4,130,535 A | 12/1978 | Coran et al. |
| 4,141,863 A | 2/1979 | Coran et al. |
| 4,141,878 A | 2/1979 | Coran et al. |
| 4,173,556 A | 11/1979 | Coran et al. |
| 4,207,404 A | 6/1980 | Coran et al. |
| 4,250,292 A | 2/1981 | Niederdellmann et al. |
| 4,271,049 A | 6/1981 | Coran et al. |
| 4,287,324 A | 9/1981 | Coran et al. |
| 4,288,570 A | 9/1981 | Coran et al. |
| 4,299,931 A | 11/1981 | Coran et al. |
| 4,311,628 A | 1/1982 | Abdou-Sabet et al. |
| 4,338,413 A | 7/1982 | Coran et al. |
| 4,593,062 A | 6/1986 | Puydak et al. |
| 4,803,244 A | 2/1989 | Umpleby |
| 4,910,245 A | 3/1990 | Flynn et al. |
| 5,597,867 A | 1/1997 | Tsujimoto et al. |
| 5,919,988 A | 7/1999 | Pazos et al. |
| 5,952,425 A | 9/1999 | Medsker et al. |
| 5,977,251 A | 11/1999 | Kao et al. |
| 6,121,383 A | 9/2000 | Abdou-Sabet et al. |
| 6,251,998 B1 | 6/2001 | Medsker et al. |
| 6,277,916 B1 | 8/2001 | Terbrueggen et al. |
| 6,545,088 B1 | 4/2003 | Kolthammer et al. |
| 9,102,824 B2 | 8/2015 | Liang et al. |
| 11,981,802 B2 * | 5/2024 | LiPiShan ................ C08L 23/16 |
| 2005/0140049 A1 | 6/2005 | James et al. |
| 2006/0199911 A1 | 9/2006 | Markovich et al. |
| 2006/0199912 A1 | 9/2006 | Fuchs et al. |
| 2006/0199914 A1 | 9/2006 | Harris et al. |
| 2006/0199930 A1 | 9/2006 | Li Pi Shan et al. |
| 2006/0199931 A1 | 9/2006 | Poon et al. |
| 2008/0033089 A1 | 2/2008 | Ellul et al. |
| 2016/0039593 A1 * | 2/2016 | Dhodapkar ............... B65B 1/04 206/526 |

(Continued)

FOREIGN PATENT DOCUMENTS

| | | |
|---|---|---|
| CN | 101027357 A | 8/2007 |
| CN | 102471551 A | 5/2012 |
| CN | 104583304 A | 4/2015 |
| CN | 104910305 A | 9/2015 |

(Continued)

OTHER PUBLICATIONS

WO2018005852 (Year: 2018).*

(Continued)

*Primary Examiner* — Irina Krylova
(74) *Attorney, Agent, or Firm* — Dinsmore & Shohl LLP

(57) ABSTRACT

Polymer compositions include an interpolymer of ethylene, an α-olefin, and a nonconjugated polyene; and from 10% to 40% by weight oil. The polymer composition has a Mooney viscosity from 20 to 70. The interpolymer may include from 66% to 75% by weight monomer units derived from ethylene; and from 0.5% to 10% by weight monomer units derived from the nonconjugated polyene. The neat interpolymer may have: a weight-average molecular weight Mw from 250 kDa to 300 kDa; a Mooney viscosity from 50 to 200; a rheology ratio $V_{0.1}/V_{100}$ less than 30; a ratio of molecular weight to low-shear viscosity $Mw/V_{0.1}$ greater than 4.0; a polydispersity index from 2.0 to 3.5; and a tan δ at 0.1 rad/sand 190° C. greater than 2.0. The polymer compositions may be in the form of pellets having desirable flow characteristics. Thermoplastic vulcanizates may include the polymer compositions. Articles may include the thermoplastic vulcanizates.

12 Claims, No Drawings

(56) References Cited

U.S. PATENT DOCUMENTS

| | | | |
|---|---|---|---|
| 2018/0105626 A1* | 4/2018 | Fontaine | C08F 2/01 |
| 2018/0244869 A1 | 8/2018 | Chung et al. | |

FOREIGN PATENT DOCUMENTS

| | | |
|---|---|---|
| CN | 107428878 A | 12/2017 |
| EP | 0751182 A1 | 1/1997 |
| GB | 2302546 A | 6/1999 |
| GB | 2473764 A | 3/2013 |
| GB | 2549372 A | 2/2018 |
| WO | 2005/090427 A2 | 9/2005 |
| WO | 2006022666 A1 | 3/2006 |
| WO | 2007136494 A2 | 11/2007 |
| WO | 2009123609 A1 | 10/2009 |
| WO | 2012092491 A2 | 7/2012 |
| WO | 2016160231 A1 | 10/2016 |
| WO | 20170198521 A1 | 11/2017 |

OTHER PUBLICATIONS

International Search Report and Written Opinion issued by the Chinese Patent Office acting as International Searching Authority issued by the International Patent Application No. PCT/CN2019/080377 dated Jan. 3, 2020 (10 pages total).

Korean Office Action dated Dec. 7, 2023, pertaining to KR Patent Application No. 10-2021-7035073, 4 pgs.

International Preliminary Report on Patentability Application No. PCT/CN2019/080377 issued on Sep. 28, 2021, pp. 1-5.

Balke, et al., "A Strategy for Interpreting Multidetector Size-Exclusion Chromatography Data II", Chromatography of Polymers, Chapter 13 (1992).

Kratochvil, P., "Fundamental Light-Scattering Methods" from Polymer Solutions, Elsevier, Oxford, NY (1987).

Zimm, "Apparatus and Methods for Measurement and Interpretation of the Angular Variation of Light Scattering; Preliminary Results on Polystyrene Solutions", The Journal of Chemical Physics, vol. 16, No. 12 (Dec. 1948).

Balke et al., "A Strategy for Interpreting Multidetector Size-Exclusion Chromatography Data I", Chromatogrpahy of Polymers, Apr. 20, 1992, Chapter 12, pp. 180-198.

161/162 Communication for U.S. Appl. No. 19/922,520 Issued on Nov. 8, 2021, pp. 1-2.

Japanese Office Action dated Sep. 25, 2023, pertaining to JP Patent Application No. 2021-557427, 3 pgs.

India Examination Report, dated Jul. 19, 2023, pertaining to Indian Patent Application No. 202117044553, 6 pgs.

Chinese Office Action and Search Report, dated Jul. 14, 2023, pertaining to Chinese Patent Application No. 201980095847.3, 12 pgs.

Supplementary European Search Report, pertaining to European Patent Application No. 19922520.2, dated Sep. 27, 2022 6 pages.

Communication Pursuant to Article 94(3) EPC, dated Feb. 28, 2024, pertaining to EP Patent Application No. 19922520.2, 3 pgs.

* cited by examiner

OIL-EXTENDED PELLET FORM ETHYLENE ALPHA-OLEFIN DIENE INTERPOLYMERS FOR THERMOPLASTIC VULCANIZATES

CROSS REFERENCES TO RELATED APPLICATIONS

This application is a national-stage application under 35 U.S.C. § 371 of International Application No. PCT/CN2019/080377, filed Mar. 29, 2019, and designating the United States.

TECHNICAL FIELD

This application relates to ethylene alpha-olefin diene interpolymers, to thermoplastic vulcanizates including the interpolymers, and to articles including the thermoplastic vulcanizates. More specifically, this application relates to oil-extended polymer compositions including ethylene alpha-olefin diene interpolymers that, in pellet form, have desirable flow characteristics, to thermoplastic vulcanizates including the same, and to articles including the thermoplastic vulcanizates.

BACKGROUND

Thermoplastic vulcanizates ("TPV"s) formed from blends of crosslinked rubber and thermoplastic are known in the art. Morphologically, TPV are characterized by the presence of finely dispersed, micro-sized, rubber particles in a continuous thermoplastic matrix. The rubber phase is vulcanized with suitable curatives, typically by a dynamic vulcanization process. Compared with conventional, non-vulcanized, thermoplastic elastomers (TPEs), TPV materials exhibit better properties, such as heat resistance, oil resistance, and elastic recovery. Compared with thermoset rubbers, TPV materials have the advantage of thermoplastic processability and recyclability. TPVs have also gained wide acceptance as a replacement of both thermoset rubbers and flexible PVC (polyvinylchloride) in a variety of applications.

The physical properties of TPVs are affected by many factors, including the molecular structure of the rubber phase, the properties of the thermoplastic phase, the cure level, and the presence of fillers. Among them, the selection of the rubber phase is considered to have the largest impact on the final properties of the TPV. Ethylene-propylene-diene (EPDM) elastomers are the most widely used rubber in TPV formulations. The molecular microstructural features of EPDM, such as comonomer content, molecular weight, molecular weight distribution, diene content, and level of long chain branching (LCB), have significant influence on the final physical properties of the TPV. There is a need for new TPV formulations with improved dispersion of the rubber phase (more uniform dispersion of the rubber phase, and the rubber particles are smaller with increased interfacial area).

Thermoplastic vulcanizates (TPVs) are produced via dynamic vulcanization of immiscible blends of a rubber and a thermoplastic, i.e., the selective crosslinking of the rubber while melt mixing with the thermoplastic. The resulting TPVs comprise cross-linked rubber particles dispersed in a thermoplastic matrix, which have both elasticity and melt processability. The majority of commercial TPVs are based on blends of ethylene/propylene/diene monomer (EPDM)-type interpolymers with polypropylene (PP), and cross-linked with phenolic or peroxide curing agents. EPDMs typically used in commercial TPV formulations have very high molecular weights; e.g., Mooney viscosity (ML (1+4@125° C.)) greater than or equal to 200. To improve processability, extender oil is often added to the EPDM polymer to reduce the apparent viscosity during production. The resulting bale form of EPDM has disadvantages in handling. For example, the bale form of EPDM requires an additional grinding step before being fed into an extruder.

Despite the variety of EPDM-based formulations currently known and used in TPVs, there is a need for formulations formed from an EPDM in the form of free flowing pellets, as opposed to highly oil extended bales, and which provides the same, or better, balance of properties as compared to the properties of conventional TPV formulations prepared using bale form, ultra-high molecular weight EPDMs. There is further a need for such TPV formulations which provide ease in handling and formulation flexibility.

SUMMARY

Against the foregoing background, embodiments of this disclosure are directed to the present invention is directed to oil-extended polymer compositions including an interpolymer of ethylene, an α-olefin, and a nonconjugated polyene; and from 10% to 40% by weight oil, based on the total weight of the polymer composition. The polymer composition may have a Mooney viscosity [ML(1+4); 125° C.] from 20 to 70. The interpolymer is composed of from 66% to 75% by weight monomer units derived from ethylene, based on the total weight of the interpolymer; and from 0.5% to 10% by weight monomer units derived from the nonconjugated polyene, based on the total weight of the interpolymer. In some embodiments, the interpolymer is an EPDM terpolymer. In some embodiments, the diene is 5-ethylidene-2-norbornene (ENB). The interpolymer may have any or all of the following properties: a weight-average molecular weight Mw from 250 kDa to 300 kDa; a Mooney viscosity [ML (1+4); 125° C.] from 50 to 200; a viscosity ratio $V_{0.1}/V_{100}$ less than 30; a ratio of molecular weight to low-shear viscosity $Mw/V_{0.1}$ greater than 4.0; a polydispersity index from 2.0 to 3.5; and a tan δ at 0.1 rad/s and 190° C. greater than 2.0. The polymer compositions may be in the form of pellets having flow characteristics quantifiable by unconfined yield strength measurements. For example, the polymer composition may be in the form of pellets, for which a mixture of the composition with 5000 ppm talc filler, based on the total weight of the mixture, has an unconfined yield strength (UYS) of less than 500 $lb/ft^2$ when UYS is measured at an unloading temperature of 22° C.; and/or less than 1500 $lb/ft^2$ when UYS is measured at an unloading temperature of 0° C.

Further embodiments of this disclosure are directed to thermoplastic vulcanizates including the oil-extended interpolymer as previously described, in combination with a thermoplastic polymer and a vulcanization agent.

Still further embodiments of this disclosure are directed to articles, for which at least one component of the article includes a thermoplastic vulcanizate as previously described.

Additional features and advantages of the embodiments described herein will be set forth in the detailed description which follows, and in part will be readily apparent to those skilled in the art from that description or recognized by practicing the embodiments described herein, including the detailed description and claims that follow.

It is to be understood that both the foregoing general description and the following detailed description describe various embodiments and are intended to provide an overview or framework for understanding the nature and character of the claimed subject matter.

DETAILED DESCRIPTION

Definitions

Unless stated to the contrary, implicit from the context, or customary in the art, all parts and percents are based on weight, and all test methods are current as of the filing date of this disclosure.

The term "composition," as used herein, includes the material(s), which comprise the composition, as well as reaction products and decomposition products formed from the materials of the composition. Any reaction product or decomposition product is typically present in trace or residual amounts.

The term "polymer composition," as used herein, includes the material(s), which comprise the polymer composition, as well as reaction products and decomposition products formed from the materials of the polymer composition. Any reaction product or decomposition product is typically present in trace or residual amounts. The polymer composition may contain, for example, one ethylene/α-olefin/non-conjugated polyene interpolymer, or may contain one such interpolymer and one or more additives. The polymer composition may contain two or more different ethylene/α-olefin/non-conjugated polyene interpolymers, or may contain such interpolymers and one or more additives.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts of impurities, such as catalyst residues, can be incorporated into and/or within the polymer.

The term "interpolymer," as used herein, refers to polymers prepared by the polymerization of at least two different types of monomers. The term interpolymer thus includes the term copolymer (employed to refer to polymers prepared from two different types of monomers) and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers.

The term "ethylene-based polymer," as used herein, refers to a polymer that comprises, in polymerized form, a majority weight percent of ethylene (based on the weight of the polymer), and optionally may comprise one or more comonomers.

The term "ethylene-based interpolymer," as used herein, refers to a polymer that comprises, in polymerized form, a majority weight percent of ethylene (based on the weight of the interpolymer), and at least one comonomer.

The term "ethylene/α-olefin/non-conjugated polyene interpolymer," as used herein, refers to a polymer that comprises, in polymerized form, ethylene, an α-olefin, and a non-conjugated polyene. In one embodiment, the "ethylene/α-olefin/non-conjugated polyene interpolymer" comprises a majority weight percent of ethylene (based on the weight of the interpolymer).

The term "ethylene/α-olefin/diene interpolymer," as used herein, refers to a polymer that comprises, in polymerized form, ethylene, an α-olefin, and a diene. In one embodiment, the "ethylene/α-olefin/diene interpolymer" comprises a majority weight percent of ethylene (based on the weight of the interpolymer).

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term, "propylene-based polymer," as used herein, refers to a polymer that comprises, in polymerized form, a majority amount of propylene monomer (based on the weight of the polymer), and optionally may comprise one or more comonomers.

The terms "comprising," "including," "having," and their derivatives, are not intended to exclude the presence of any additional component, step or procedure, whether or not the same is specifically disclosed. All compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Reference will now be made in detail to embodiments of polymer compositions, thermoplastic vulcanizates including the polymer compositions, and articles including the thermoplastic vulcanizates. It has been discovered that the ethylene/α-olefin/non-conjugated polyene interpolymers (for example, EPDM terpolymers) have low levels of long chain branching (LCB). The interpolymers also exhibit unique rheological behavior (i.e., high tan delta and low rheological ratio V0.1/V100), enabling such interpolymers to be produced and transported through the devolatilization units and gear pumps, typically used in the solution polymerization processes. Pellets of the interpolymers have desirable flow characteristics that lessen or eliminate the need for grinding steps common with bale-form polymers. Further, the interpolymers can be used to form improved TPV formulations and high filler formulations, each requiring higher performing polymers with improved mechanical properties, and better processability (for example, faster mixing of compounds or improved extrusion processability).

Polymer Compositions

Polymer compositions or oil-extended polymer compositions according to embodiments include an interpolymer of ethylene, an α-olefin, and a nonconjugated polyene; and from 10% to 40% by weight oil, based on the total weight of the polymer composition. In some embodiments, the interpolymer includes from 66% to 75% by weight monomer units derived from ethylene, based on the total weight of the interpolymer; and from 0.5% to 10% by weight monomer units derived from the nonconjugated polyene, based on the total weight of the interpolymer. Additional features of the interpolymer and the polymer compositions will now be described. It should be understood that the polymer composition also may be embodied through any combination of two or more embodiments as described herein.

In some embodiments, the polymer composition comprises from 60 to 80 weight percent ethylene, or from 65 to 75 weight percent ethylene, or from 68 to 75 weight percent ethylene, based on the weight of polymer composition. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In some embodiments, the polymer composition comprises from 0.5 to 10 weight percent, from 2.0 to 7.0 weight percent, or from 2.5 to 6.5 weight percent, or from 3.0 to 6.0 weight percent, or from 3.5 to 5.5 weight percent nonconjugated polyene, based on the weight of polymer composition. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In some embodiments, the polymer composition has a weight average molecular weight (Mw) greater than or equal to 200 kDa (kilo Dalton=g/mol), or greater than or equal to 220 kDa, or greater than or equal to 250 kDa, or greater than or equal to 265 kDa. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In some embodiments, the polymer composition has a weight average molecular weight (Mw) less than or equal to 400 kDa, or less than or equal to 350 kDa, or less than or equal to 300 kDa, or less than or equal to 280 kDa. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In some embodiments, the polymer composition has a weight average molecular weight (Mw) from 200 kDa to 400 kDa, or from 220 kDa to 350 kDa, or from 250 kDa to 300 kDa, or from 265 kDa to 280 kDa. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In some embodiments, the polymer composition including the interpolymer and the oil has a Mooney Viscosity greater than or equal to 20, or greater than or equal to 30, or greater than or equal to 40, or greater than or equal to 45 (ML 1+4, 125° C.). In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In some embodiments, the polymer composition including the interpolymer and the oil has a Mooney Viscosity less than or equal to 70, or less than or equal to 65, or less than or equal to 60, or less than or equal to 55 (ML 1+4, 125° C.). In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In some embodiments, the polymer composition including the interpolymer and the oil has a Mooney Viscosity from 20 to 70, from 30 to 60, from 40 to 60, or from 45 to 55 (ML 1+4, 125° C.). In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In some embodiments, the polymer composition has a low-shear viscosity at 0.1 rad/sec, 190° C., greater than or equal to 10,000 Pa·s, or greater than or equal to 12,000 Pa·s, or greater than or equal to 15,000 Pa·s. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In some embodiments, the polymer composition has a viscosity at 0.1 rad/sec, 190° C., less than or equal to 100,000 Pa·s, or less than or equal to 90,000 Pa·s, or less than or equal to 80,000 Pa·s, or less than or equal to 70,000 Pa·s, or less than or equal to 60,000 Pa·s. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In some embodiments, the polymer composition has a viscosity at 0.1 rad/sec, 190° C., from 10,000 Pa·s to 100,000 Pa·s, or from 30,000 Pa·s to 90,000 Pa·s, or from 40,000 Pa·s to 80,000 Pa·s, or from 40,000 Pa·s to 70,000 Pa·s, or from 40,000 Pa·s to 60,000 Pa·s, or from 50,000 Pa·s to 60,000 Pa·s, or from 55,000 Pa·s to 60,000 Pa·s. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In some embodiments, the polymer composition has a rheology ratio (V0.1/V100 at 190° C.) greater than or equal to 10, or greater than or equal to 15, or greater than or equal to 20. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In some embodiments, the polymer composition has a rheology ratio (V0.1/V100 at 190° C.) less than or equal to 40, or less than or equal to 30, or less than or equal to 25. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In some embodiments, the polymer composition has a rheology ratio (V0.1/V100 at 190° C.) from 10 to 40, from 10 to 30, from 20 to 30, or from 20 to 25. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In some embodiments, the polymer composition has a ratio of molecular weight to low-shear viscosity Mw/V0.1 ((g/mol)/(Pa·s)) greater than 3.2, greater than 3.5, greater than 4.0. or greater than 4.5, such as, for example, from 3.2 to 10.0, from 3.5 to 10.0, from 4.0 to 10.0, from 4.5 to 10.0, from 4.0 to 8.0, from 4.0 to 6.0, or from 4.0 to 5.0. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In some embodiments, the polymer composition has a polydispersity index (PDI) or molecular-weight distribution (Mw/Mn) from 1.5 to 4.0, such as from 2.0 to 3.5, for example.

In some embodiments, the polymer composition has a tan delta (0.1 rad/sec, 190° C.) greater than 1.8, greater than 1.9, greater than 2.0, or greater than 2.1, such as, for example, from 1.8 to 5.5, or from 1.9 to 5.0, or from 2.0 to 5.0, or from 2.1 to 5.0, or from 2.1 to 4.0, or from 2.1 to 3.0, or from 2.1 to 2.5, or from 2.1 to 2.3. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In some embodiments, the polymer composition has a MWD less than or equal to 3.50, further less than or equal to 3.20, further less than or equal to 3.00. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In some embodiments, the polymer composition has a MWD greater than or equal to 1.80, or greater than or equal to 1.90, or greater than or equal to 2.00. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In some embodiments, the polymer composition has a "13C NMR % Peak Area," which is the {[(13C NMR peak area from 21.3 ppm to 21.8 ppm) divided by the (total integral area from 19.5 ppm to 22.0 ppm)]×100}, that is greater than or equal to 3.0 percent, or greater than, or equal 4.0 percent, or greater than, or equal 5.0 percent, as determined by 13C NMR. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In some embodiments, the polymer composition has a "13C NMR % Peak Area," which is the {[(13C NMR peak area from 21.3 ppm to 21.8 ppm) divided by the (total integral area from 19.5 ppm to 22.0 ppm)]×100}, that is from 3.0 to, 30.0 percent, or from 4.0 to 30.0 percent, or from 5.0 to 30.0 percent, as determined by 13C NMR. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In some embodiments, the polymer composition comprises, consists essentially of, or consists of the interpolymer and the oil. In some embodiments, the polymer composition includes from 60 wt. % to 90 wt. %, or from 65 wt. % to 90 wt. %, or from 70 wt. % to 90 wt. %, or from 60 wt. % to 80 wt. %, or from 60 wt. % to 70 wt. % ethylene/alpha-olefin/non-conjugated polyene interpolymer, based on the total weight of the polymer composition. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In some embodiments, the polymer composition has density from 0.860 g/cm³ to 0.920 g/cm³, or from 0.860 g/cm³ to 0.910 g/cm³, or from 0.860 g/cm³ to 0.900 g/cm³, or from 0.860 g/cm³ to 0.890 g/cm³. In a further embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In some embodiments, the polymer composition is in pellet form. In some embodiments, the polymer composition in pellet form may pass one or both of a room-temperature flowability test criterion and/or a 0° C. flowability test criterion. These test criteria are based on measurements of unconfined yield strength (UYS) of the pellets. Flowability of the EPDM compositions is assessed from UYS measurements determined according to the procedure described in the Examples section of this disclosure. Specifically, for the polymer compositions of this disclosure, a talc-coated (5000 ppm) polymer composition having a UYS or less than or equal to 500 lb/ft² when the UYS is measured at an unloading temperature of 22° C. is determined to "Pass" a room-temperature flowability test. A talc-coated (5000 ppm) polymer composition having a UYS greater than 500 lb/ft² when the UYS is measured at an unloading temperature of 22° C. is determined to "Fail" the room-temperature flowability test. Similarly, a talc-coated (5000 ppm) polymer composition having a UYS or less than or equal to 1500 lb/ft² when the UYS is measured at an unloading temperature of 0° C. is determined to "Pass" a 0° C. flowability test. A talc-coated (5000 ppm) polymer composition having a UYS greater than 1500 lb/ft² when the UYS is measured at an unloading temperature of 0° C. is determined to "Fail" the 0° C. flowability test.

Ethylene/α-Olefin/Nonconjugated Polyene Interpolymers

The ethylene/α-olefin/non-conjugated polyene interpolymer of the polymer compositions described herein, comprise, in polymerized form, ethylene, an α-olefin, and a non-conjugated polyene. Suitable examples of α-olefins include the C3-C20 α-olefins, and preferably propylene. Suitable examples of nonconjugated polyenes include the C4-C40 nonconjugated dienes.

The α-olefin may be either an aliphatic or an aromatic compound. The α-olefin is preferably a C3-C20 aliphatic compound, preferably a C3-C16 aliphatic compound, and more preferably a C3-C10 aliphatic compound. Preferred C3-C10 aliphatic α-olefins are selected from the group consisting of propylene, 1-butene, 1-hexene and 1-octene, and more preferably propylene. In a further embodiment, the interpolymer is an ethylene/propylene/-diene (EPDM) terpolymer. In a further embodiment, the diene is 5-ethylidene-2-norbornene (ENB).

Illustrative nonconjugated polyenes include straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. The polyene is preferably a nonconjugated diene selected from the group consisting of ENB, dicyclopentadiene, 1,4-hexadiene, 7-methyl-1,6-octadiene, and preferably, ENB, dicyclopentadiene and 1,4-hexadiene, more preferably ENB and dicyclopentadiene, and even more preferably ENB.

In one embodiment, the ethylene/α-olefin/nonconjugated polyene interpolymer comprises a majority amount of polymerized ethylene, based on the weight of the interpolymer. In a further embodiment, the ethylene/α-olefin/non-conjugated polyene interpolymer is an ethylene/α-olefin/dene interpolymer. In a further embodiment, the interpolymer is an EPDM. In a further embodiment, the diene is ENB.

In one embodiment, the ethylene/α-olefin/nonconjugated polyene interpolymer has a molecular weight distribution (Mw/Mn) from 1.7 to 5.0, or from 2.0 to 4.0, or from 2.5 to 3.5. In a further embodiment, the ethylene/α-olefin/nonconjugated polyene interpolymer is an ethylene/α-olefin/diene interpolymer (EAODM). In a further embodiment, the interpolymer is an EPDM. In a further embodiment, the diene is ENB.

In one embodiment, the neat ethylene/α-olefin/nonconjugated polyene interpolymer has a Mooney viscosity, ML(1+4) at 125° C., Mooney Viscosity from 50 to 200, from 75 to 175, from 100 to 175, or from 75 to 125. The neat polymer refers to the polymer without filler and without oil. Mooney viscosity of the neat interpolymer may be measured directly on the neat interpolymer or may be calculated from measurements obtained from polymers that contain a filler, such as carbon black, and/or an oil. In a further embodiment, the ethylene/α-olefin/nonconjugated polyene interpolymer is an ethylene/α-olefin/diene interpolymer. In a further embodiment, the interpolymer is an EPDM. In a further embodiment, the diene is ENB.

In one embodiment, the ethylene/α-olefin/nonconjugated polyene interpolymer is a colorable interpolymer. In a further embodiment, the ethylene/α-olefin/nonconjugated polyene interpolymer is an ethylene/α-olefin/diene interpolymer. In a further embodiment, the interpolymer is an EPDM. In a further embodiment, the diene is ENB.

An ethylene/α-olefin/nonconjugated polyene interpolymer may include a combination of two or more embodiments as described herein.

An ethylene/alpha-olefin/diene interpolymer may include a combination of two or more embodiments as described herein.

An EPDM terpolymer may include a combination of two or more embodiments as described herein.

Oils

Oils include, but are not limited to, petroleum oils, such as aromatic and naphthenic oils; polyalkylbenzene oils; organic acid monoesters, such as alkyl and alkoxyalkyl oleates and stearates; organic acid diesters, such as dialkyl, dialkoxyalkyl, and alkyl aryl phthalates, terephthalates, sebacates, adipates, and glutarates; glycol diesters, such as tri-, tetra-, and polyethylene glycol dialkanoates; trialkyl trimellitates; trialkyl, trialkoxyalkyl, alkyl diaryl, and triaryl phosphates; chlorinated paraffin oils; coumarone-indene resins; pine tars; vegetable oils, such as castor, tall, rapeseed, and soybean oils and esters and epoxidized derivatives thereof; and the like.

In embodiments, the polymer composition may include from 10 wt. % to 40 wt. % oil, or from 15 wt. % to 35 wt. % oil, or from 20 wt. % to 35 wt. % oil, or from 25 wt. % to 35 wt. % oil, or about 30 wt. % oil, for example, based on the total weight of the polymer composition.

In one embodiment, the oil is selected from the group consisting of nonaromatic oils, paraffinic oils, naphthenic oils, and combinations thereof. Suitable oils include, but are not limited to, PARALUX 6001, HYDROBRITE 550, and CALSOL.

An oil may comprise a combination of two or more embodiments as described herein.

Additives

The polymer composition according to embodiments previously described may include additional ingredients or may be incorporated into a composition or formulation. For example, the polymer composition may include one or more additional additives. Suitable additives include, but are not limited to, fillers, antioxidants, UV stabilizers, flame retardants, colorants or pigments, crosslinking agents, and combinations thereof.

In embodiments, the polymer composition may further include a crosslinking agent. Crosslinking agents include, but are not limited to, sulfur-containing compounds, such as elemental sulfur, 4,4'-dithiodimorpholine, thiuram di- and polysulfides, alkylphenol disulfides, and 2-morpholino-dithiobenzothiazole; and peroxides, such as di-tertbutyl peroxide, tertbutylcumyl peroxide, dicumyl peroxide, 2,5-dimethyl-2,5-di-(tertbutylperoxy) hexane, di-(tertbutylperoxyisopropyl) benzene, tertbutyl peroxybenzoate and 1,1-di-(tertbutylperoxy)-3,3,5-trimethylcyclohexane.

In embodiments, the polymer compositions may further include a filler. Suitable fillers include, but are not limited to, clay, $CaCO_3$, talc, carbon black, and mineral fibers.

In embodiments, the polymer compositions may further include a thermoplastic polymer. Polymers, include, but not limited to, propylene-based polymers, ethylene-base polymers, and olefin multi-block interpolymers. Suitable ethylene-base polymers include, but are not limited to, high density polyethylene (HDPE), linear low density polyethylene (LLDPE), very low density polyethylene (VLDPE), ultra low density polyethylene (ULDPE), homogeneously branched linear ethylene/α-olefin interpolymers, and homogeneously branched substantially linear ethylene/α-olefin interpolymers (that is homogeneously branched long chain branched ethylene/α-olefin interpolymers).

Articles

Further embodiments include articles, of which one or more components, or the entire article, includes a polymer composition as described herein. Examples of such articles include, but are not limited to, sheets, foams, molded goods, and extruded parts. Additional articles include automotive parts, weather strips, belts, hoses, wire and cable jacketing, flooring materials, gaskets, tires, computer parts, building materials and footwear components. A skilled artisan can readily augment this list without undue experimentation. In one embodiment, the article is an automotive part.

An inventive article may comprise a combination of two or more embodiments described herein.

Process

The polymer compositions according to embodiments herein may be prepared by any suitable polymerization process. In exemplary embodiments, a process for forming a polymer composition according to this disclosure may include polymerizing ethylene, an α-olefin, and a non-conjugated polyene, in the presence of a catalyst system to form an interpolymer. The process may further include combining the interpolymer with an oil to form the polymer composition.

For polymerizing the ethylene, α-olefin, and non-conjugated polyene, in some embodiments, the catalyst system may include a catalyst and one or more co-catalysts. Suitable catalysts may include one or more metal-ligand complex disclosed in International Application Publication WO/2016/160231 A1, which is incorporated herein by reference. In exemplary embodiments, the catalyst system may include a metal-ligand complex such as {[[[2',2'''-[1,3-propanediylbis(oxy-kO)]bis[3-[3,6-bis(1,1-dimethylethyl)-9H-carbazol-9-yl]-5'-fluoro-5-(1,1,3,3-tetramethylbutyl)[1,1'-biphenyl]-2-olato-kO]](2-)]-hafniumdimethyl} (CAS #1360629-63-5) having Formula (I):

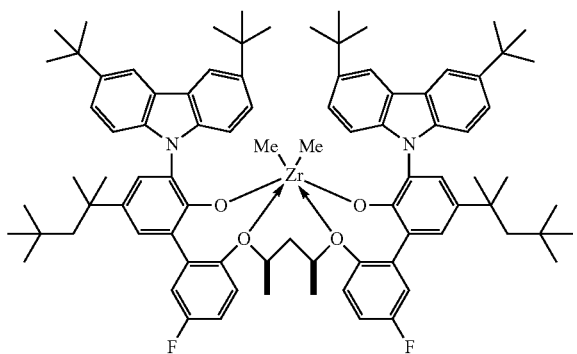

(I)

In embodiments of the polymerization process, the interpolymer prepared by polymerizing the ethylene, α-olefin, a non-conjugated polyene, in the presence of the catalyst system may exhibit the properties of the interpolymer as previously described herein with respect to the polymer compositions. For example, the interpolymer may have any or all of the following properties: a weight-average molecular weight Mw from 250 kDa to 300 kDa; a Mooney viscosity [ML(1+4); 125° C.] from 50 to 200; a viscosity ratio $V_{0.1}/V_{100}$ less than 30; a ratio of molecular weight to low-shear viscosity $Mw/V_{0.1}$ greater than 4.0; a polydispersity index from 2.0 to 3.5; and a tan δ at 0.1 rad/s and 190° C. greater than 2.0.

In one embodiment, the process comprises polymerizing the one or more mixture(s) in one or more reactors, and wherein the ethylene conversion in at least one reactor is less than 90.0%. In a further embodiment, the ethylene conversion is less than 89.0%, or less than 88.0%. In one embodiment, the ethylene conversion in at least one reactor is greater than 50.0%, or greater than 55.0%, or greater than 60.0%.

In one embodiment, the process comprises polymerizing the one or more mixture(s) in one or more reactor(s), and wherein the reactor temperature in at least one reactor is less than 150° C., or less than 140° C., or less than 145° C.

In one embodiment, the process comprises polymerizing the one or more mixture(s) in one or more reactor(s), and wherein the reactor temperature in at least one reactor is greater than 90° C., or greater than 100° C., or greater than 110° C.

In one embodiment, the ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In one embodiment, the polymer composition comprises two ethylene/α-olefin/non-conjugated polyene interpolymers, and wherein the interpolymers differ in one or more of the following properties: Mw, Mn, MWD, V0.1, V100, V0.1/V100, density and/or Mooney Viscosity. In a further embodiment, each ethylene/α-olefin/non-conjugated polyene interpolymer is an ethylene/α-olefin/diene interpolymer (EAODM). In a further embodiment, the interpolymer is an EPDM. In a further embodiment, the diene is ENB.

In one embodiment, the process comprises polymerizing the one or more mixture(s) in one reactor or in two reactors. For example one or more polymerization reactors, connected in parallel, series, or combinations thereof.

In one embodiment, the process may include polymerizing the one or more mixture(s) in one or more reactor(s) is a solution polymerization. As used herein the term "solution polymerization," refers to a polymerization process in which the polymer formed is soluble in reaction medium (for example, a hydrocarbon-based solvent like ISOPAR E). The solubility of the polymer will depend primarily on the polymerization temperature and the polymer concentration.

In one embodiment, the polymerization is conducted at a temperature from 90° C. to 200° C., or from 95° C. to 180° C., or from 100° C. to 160° C.

In one embodiment, the polymerization may include two or more co-catalysts. Suitable cocatalysts for use include polymeric or oligomeric aluminoxanes, especially methyl aluminoxane, as well as inert, compatible, noncoordinating, ion forming compounds. Exemplary suitable cocatalysts include, but are not limited to modified methyl aluminoxane (MMAO), bis(hydrogenated tallow alkyl)methyl, tetrakis (pentafluorophenyl)borate(1-) amine, triethyl aluminum (TEA), and any combinations thereof.

In one embodiment, the catalyst system further comprises at least one cocatalyst selected from a borate, an alkyl aluminum, an aluminoxane, or a combination thereof.

In one embodiments, one or more of the foregoing activating co-catalysts are used in combination with each other. An especially preferred combination is a mixture of a tri((C$_1$-C$_4$)hydrocarbyl)aluminum, tri((C$_1$-C$_4$)hydrocarbyl)borane, or an ammonium borate with an oligomeric or polymeric alumoxane compound.

In one embodiment, the ratio of total number of moles of one or more metal-ligand complexes of Formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less.

Thermoplastic Vulcanizates

Thermoplastic vulcanizates according to embodiments may include a polymer composition or oil-extended polymer composition as previously described, including one or more ethylene/α-olefin/non-conjugated polyene interpolymer and an oil. In exemplary embodiments, the interpolymer may be an EPDM, and/or the polyene may be ENB. In addition to the polymer composition, the thermoplastic vulcanizates may further include a thermoplastic polymer, a vulcanization agent, and one or more optional additives.

Thermoplastic Polymers

Thermoplastic polymers include, but are not limited to, propylene-based polymers, ethylene-based polymers, and polyesters.

In one embodiment, the thermoplastic polymer is present in an amount from 20 to 150, further from 25 to 100, and further from 30 to 50 PHR (based on 100 parts of the ethylene/α-olefin/nonconjugated polyene or based on 100 parts sum of the first ethylene/α-olefin/nonconjugated polyene interpolymer and the second ethylene/α-olefin/nonconjugated polyene interpolymer).

In one embodiment, the thermoplastic polymer has a weight average molecular weight (Mw) from 10,000 to 1,000,000 g/mol, further from 20,000 to 500,000 g/mole, and further from 50,000 to 300,000 g/mole.

A thermoplastic polymer may comprise a combination of two or more embodiments as described herein.

In one embodiment, the thermoplastic polymer is a propylene-based polymer. Suitable propylene-based polymers include, but are not limited to, polypropylene homopolymers, propylene/ethylene copolymers, propylene/α-olefin copolymers, and impact modified polypropylene.

In one embodiment, the propylene-based polymer is post-modified using a vis-breaking process.

In one embodiment, the propylene-based polymer has a melting point (Tm), as determined by DSC greater than or equal to 140° C., further greater than or equal to 150° C., and further greater than or equal to 160° C.

In one embodiment, the propylene-based polymer has a melting point from 140° C. to 165° C., further from 150° C. to 165° C., and further from 160° C. to 165° C., as determined by DSC.

In one embodiment, the propylene-based polymer has a density from 0.87 to 0.91 g/cm$^3$, and further from 0.88 to 0.90 g/cm$^3$ (1 cc=1 cm$^3$).

In one embodiment, the propylene-based polymer has a melt flow rate (MFR) from 0.5 to 100 g/10 min, further from 0.5 to 50 g/10 min, further from 0.5 to 10 g/10 min, and further 0.5 to 5 g/10 min, as determined by ASTM D 1238 (230° C./2.16 kg).

In one embodiment, the propylene-based polymer has a molecular weight distribution (MWD) from 1.7 to 10, further from 1.8 to 5, and further from 2 to 3.5.

In one embodiment, the propylene-based polymer is a propylene/α-olefin copolymer. Examples of suitable α-olefins include, but are not limited to, isobutylene, 1-butene, 1-pentene, 1-hexene, 4-methyl-1-pentene, and 1-octene, and further 1-butene, 1-hexene, and 1-octene.

In one embodiment, the propylene/α-olefin copolymer has a melting point (Tm), as determined by DSC greater than or equal to 80° C., further greater than or equal to 100° C., and further greater than or equal to 120° C.

In one embodiment, the propylene-based polymer is a propylene/ethylene copolymer.

In one embodiment, the propylene/ethylene copolymer comprises greater than or equal to 90 wt %, or greater than or equal to 92 wt %, or greater than or equal to 94 wt %, or greater than or equal to 96 wt %, or greater than or equal to 98 wt % of polymerized propylene, based on the weight of the copolymer.

In one embodiment, the propylene/ethylene copolymer comprises less than or equal to 10 wt %, or less than or equal to 8 wt %, or less than or equal to 6 wt %, or less than or equal to 4 wt %, or less than or equal to 2 wt % of polymerized ethylene, based on the weight of the copolymer.

In one embodiment, the propylene/ethylene copolymer has a melting point (Tm), as determined by DSC greater than or equal to 80° C., further greater than or equal to 100° C., and further greater than or equal to 120° C.

In one embodiment, the propylene-based polymer is a polypropylene homopolymer.

Suitable propylene-based polymers include, but are not limited to, BRASKEM Propylene H110-02N, VERSIFY Plastomers and Elastomers (for example, VERSIFY 2000 Plastomer, VERSIFY 2200 Plastomer), and VISTAMAXX Polymers (for example, VISTAMAXX 3000).

A propylene-based polymer may comprise a combination of two or more embodiments as described herein.

A propylene/α-olefin copolymer may comprise a combination of two or more embodiments as described herein. A propylene/ethylene copolymer may comprise a combination of two or more embodiments as described herein. A polypropylene homopolymer may comprise a combination of two or more embodiments as described herein.

In one embodiment, the thermoplastic polymer is an ethylene-based polymer. Suitable ethylene-base polymers include, but are not limited to, high density polyethylene (HDPE), low density polyethylene (LDPE), linear low density polyethylene (LLDPE), very low density polyethylene (VLDPE), ultra low density polyethylene (ULDPE), homogeneously branched linear ethylene polymers, and homogeneously branched substantially linear ethylene polymers (that is homogeneously branched, long chain branched ethylene polymers).

In one embodiment, the ethylene-based polymer has a density from 0.900 to 0.965 g/cm$^3$, and further from 0.910 to 0.960 g/cm$^3$.

In one embodiment, the ethylene-based polymer has a melt index (I2) from 0.5 to 100 g/10 min, further from 0.5 to 50 g/10 min, further from 0.5 to 10 g/10 min, and further 0.5 to 5 g/10 min, as determined by ASTM D 1238 (190° C./2.16 kg).

In one embodiment, the ethylene-based polymer has a molecular weight distribution (MWD) from 1.7 to 30, further from 1.7 to 10, and further from 1.7 to 5.

In one embodiment, the ethylene-based polymer is a polyethylene homopolymer.

In one embodiment, the ethylene-based polymer is an ethylene/α-olefin copolymer. In a further embodiment, the α-olefin is a $C_3$-$C_{10}$ α-olefin. Suitable α-olefins include propylene, 1-butene, 1-hexene and 1-octene.

Some commercial examples of suitable ethylene-based polymers include commercially available HDPE, commercially available LDPE, ATTANE, AFFINITY, DOWLEX, FLEXOMER, ELITE, all available from The Dow Chemical Company; and EXCEED and EXACT available from ExxonMobil Chemical Company.

In one embodiment, the ethylene-based polymer is an ethylene multi-block copolymer. For example, see WO 2005/090427, US2006/0199931, US2006/0199930, US2006/0199914, US2006/0199912, and US2006/0199911, each publication is incorporated herein by reference.

An ethylene-based polymer may comprise a combination of two or more embodiments as described herein. An ethylene/α-olefin copolymer may comprise a combination of two or more embodiments as described herein. A polyethylene homopolymer may comprise a combination of two or more embodiments as described herein.

Vulcanization Agents

The thermoplastic vulcanizate according to embodiments further includes a vulcanization agent. A preferred vulcanization agent is phenolic resin. Other curing agents include, but are not limited to, peroxides, azides, aldehyde-amine reaction products, vinyl silane grafted moieties, hydrosilylation, substituted ureas, substituted guanidines; substituted xanthates; substituted dithiocarbamates; sulfur-containing compounds, such as thiazoles, imidazoles, sulfenamides, thiuramidisulfides, paraquinonedioxime, dibenzoparaquinonedioxime, sulfur; and combinations thereof. See Encyclopedia of Chemical Technology, Vol. 17, 2nd edition, Interscience Publishers, 1968; also Organic Peroxides, Daniel Seern, Vol. 1, Wiley-Interscience, 1970), which are incorporated by reference herein in their entirety.

The vulcanization agent may be a phenolic curing agent (and, optional, cure accelerator stannous chloride), or a peroxide curing agent, with an optional co-agent, or hydrosilylation cross-linking agent with a hydrosilylation catalyst, or dibutyl tin dilaurate ("DBTDL"), with an optional co-agent alumina trihydrate ("ATH"), for silane-grafted interpolymer. A phenolic resin, cure accelerator stannous chloride and acid scavenger zinc oxide can be used for EPDM curing (peroxide, or sulphur or hydrosilation curing systems can also be used).

Any phenolic curative system which can fully cure EPDM rubber is suitable. While it is preferred to fully cure the elastomer, it is not always necessary. In some embodiments, the elastomer is partially cured or substantially cured. A basic ingredient of such system is a phenolic curing resin made by condensation of halogen substituted phenol, $C_1$-$C_{10}$ alkyl substituted phenol or unsubstituted phenol with an aldehyde, preferably, formaldehyde, in an alkaline medium or by condensation of bifunctional phenoldialcohols. Dimethylol phenols substituted in the para-position with $C_5$-$C_{10}$ alkyl groups are preferred. Halogenated alkyl substituted phenol curing resins prepared by halogenation of alkyl substituted phenol curing resin are also especially suitable. Phenolic curative systems comprising methylol phenolic resins, halogen donor and metal compound are especially recommended, details of which are described in Giller, U.S. Pat. No. 3,287,440 and Gerstin et al, U.S. Pat. No. 3,709,840, which are incorporated by reference herein in their entirety. Another suitable class of phenolic curative system is disclosed in U.S. Pat. No. 5,952,425, which is incorporated by reference herein in its entirety.

In addition to phenolic curatives, azides may also be used as cross-linking agents. Suitable azides include, but are not limited to, azidoformates, such as tetramethylenebis-(azidoformate) (see also U.S. Pat. No. 3,284,421, incorporated herein by reference); aromatic polyazides, such as 4,4'-diphenylmethane diazide (see, also, U.S. Pat. No. 3,297,674, incorporated herein by reference); and sulfonazides, such as p,p'-oxybis(benzene sulfonyl azide). Suitable peroxides as vulcanization agents include, but are not limited to, aromatic dactyl peroxides; aliphatic dactyl peroxides; dibasic acid peroxides; ketene peroxides; alkyl peroxyesters; alkyl hydroperoxides (for example, diacetylperoxide; dibenzoylperoxide; bis-2,4-dichlorobenzoyl peroxide; di-tert-butyl peroxide; dicumylperoxide; tert-butyl-perbenzoate; tert-butylcumylperoxide; 2,5-bis (t-butylperoxy)-2,5-dimethylhexane; 2,5-bis (t-butylperoxy)-2,5-dimethylhexyne-3; 4,4,4',4'-tetra-(t-butylperoxy)-2,2-dicyclohexylpropane; 1,4-bis-(t-butylperoxyisopropyl)-benzene; 1,1-bis-(t-butylperoxy)-3,3,5-trimethyl-cyclohexane; lauroyl peroxide; succinic acid peroxide; cyclohexanone peroxide; t-butyl peracetate; butyl hydroperoxide; etc.

The vulcanizing elastomer may be grafted to a vinyl silane monomer, in the presence of a low level of peroxide, via a separate reactive extrusion process. Suitable vinyl silanes include, but are not limited to, vinyl trimethoxysilane, vinyl triethoxysilane. The grafted elastomer may then be reacted with water to cure the polymer in the presence of a catalyst such as dibutyl tin dilaurate during the dynamic vulcanization process. Suitable water sources include, but are not limited to, steam, water/ethylene glycol mixtures, aluminum trihydrate, and magnesium hydroxide.

Silicon hydride having at least two SiH groups in the molecule may be reacted with the carbon-carbon multiple bonds of the unsaturated rubber component in the presence of a hydrosilylation catalyst to form useful crosslinks during dynamic vulcanization. Suitable silicon hydride compounds include, but are not limited to, methylhydrogen polysiloxanes, methylhydrogen dimethyl-siloxane copolymers, methylhydrogen alkyl methyl polysiloxanes, bis(dimethylsilyl)alkanes and bis(dimethylsilyl)benzene. The amount of silicon hydride compound useful in the process of the composition can range from about 0.1 to about 10.0 mole equivalents of SiH per carbon-carbon double bond in the rubber, and preferably is in the range of about 0.5 to about 5.0 mole equivalents of SiH per carbon-carbon double bond in the rubber component of the thermoplastic elastomer. Suitable catalysts for the hydrosilylation vulcanization reaction include transition metals of Group VIII such as palladium, rhodium, platinum and the like, including complexes of these metals. Chloroplatinic acid has been disclosed as an useful catalyst in U.S. Pat. Nos. 4,803,244 and 5,597,867. The use of hydrosilylation crosslinking to dynamically vulcanize EPDM to produce TPV's was disclosed in U.S. Pat. No. 6,251,998 (Medsker, et al., Jun. 26, 2001), which is incorporated by reference herein in its entirety.

A vulcanization agent may comprise a combination of two or more embodiments as described herein. The thermoplastic vulcanizate can be pelletized. An inventive composition may comprise a combination of two or more embodiments as described herein.

Additives

The thermoplastic vulcanizates according to embodiments may further include one or more additional additives. Suitable additives include, but are not limited to, fillers, antioxidants, UV stabilizers, flame retardants, colorants or pigments, and combinations thereof.

Fillers include, but are not limited to, silicates of aluminum, magnesium, calcium, sodium, potassium and mixtures thereof; carbonates of calcium, magnesium and mixtures thereof; oxides of silicon, calcium, zinc, iron, titanium, and aluminum; sulfates of calcium, barium, and lead; alumina trihydrate; magnesium hydroxide; natural fibers, synthetic fibers, and the like.

Some antioxidants and antiozonants include, but are not limited to, hindered phenols, bisphenols, and thiobisphenols; and substituted hydroquinones. Foaming agents, such as azodicarbonamide, can be used for making a foam structure.

Method of Making TPVs

Thermoplastic vulcanizates are typically prepared by blending plastic and cured rubbers by dynamic vulcanization. The compositions can be prepared by any suitable method for mixing of rubbery polymers including mixing on a rubber mill or in internal mixers such as a Banbury mixer. In the compounding procedure, the conventional compounding ingredients are incorporated. Such compounding ingredients may include one or more types of carbon black, additional extender oil, other fillers such as clay, silica, and the like, tackifiers, waxes, bonding resins and the like, zinc oxide, antioxidants, antiozonants, processing aids, and the cure active agents. Generally, it is preferred to add the cure active agents in a second stage of compounding which may be on a rubber mill or in an internal mixer operated at a temperature normally not in excess of about 60° C. The cure active agents may include sulfur and the various sulfur containing accelerators. The compounds are cured in a conventional manner by heating for from about 5 to about 60 minutes at temperatures of from about 150° C. to about 200° C. to form novel elastomeric vulcanizates having useful properties as described herein. Specific embodiments of the invention are hereinafter described, by way of illustration only.

Dynamic vulcanization is a process whereby a blend of plastic, rubber and rubber curative is masticated while curing the rubber. The term "dynamic" indicates the mixture is subjected to shear forces during the vulcanization step as contrasted with "static" vulcanization wherein the vulcanizable composition is immobile (in fixed relative space) during the vulcanization step. One advantage of dynamic vulcanization is that elastoplastic (thermoplastic elastomeric) compositions may be obtained when the blend contains the proper proportions of plastic and rubber. Examples of dynamic vulcanization are described in U.S. Pat. Nos. 3,037,954; 3,806,558; 4,104,210; 4,116,914; 4,130,535; 4,141,863; 4,141,878; 4,173,556; 4,207,404; 4,271,049

4,287,324; 4,288,570; 4,299,931; 4,311,628 and 4,338,413 and are hereby incorporated by reference in their entirety.

Any mixer capable of generating a shear rate of 2000 sec$^{-1}$ or greater is suitable for carrying out the process. Generally, this requires a high speed internal mixer having a narrow clearance between the tips of the kneading elements and the wall. Shear rate is the velocity gradient in the space between the tip and the wall. Depending upon the clearance between the tip and the wall, rotation of the kneading elements from about 100 to about 500 revolutions per minute (rpm) is generally adequate to develop a sufficient shear rate. Depending upon the number of tips on a given kneading element and the rate of rotation, the number of times the composition is kneaded by each element is from about 1 to about 30 times per second, preferably from about 5 to about 30 times per second, and more preferably from about 10 to about 30 times per second. This means that material typically is kneaded from about 200 to about 1800 times during vulcanization. For example, in a typical process with a rotor with three tips rotating at about 400 rpm in a mixer having a residence time of about 30 seconds, the material is kneaded about 600 times.

A mixer satisfactory for carrying out the process is a high shear mixing extruder produced by Werner & Pfleiderer, Germany. The Werner & Pfleiderer (W&P) extruder is a twin-shaft screw extruder in which two intermeshing screws rotate in the same direction. Details of such extruders are described in U.S. Pat. Nos. 3,963,679 and 4,250,292; and German Pat. Nos. 2,302,546; 2,473,764 and 2,549,372, the disclosures of which are incorporated herein by reference. Screw diameters vary from about 53 mm to about 300 mm; barrel lengths vary but generally the maximum barrel length is the length necessary to maintain a length over diameter ratio of about 42. The shaft screws of these extruders normally are made-up of alternating series of conveying sections and kneading sections. The conveying sections cause material to move forward from each kneading section of the extruder. Typically there are about an equal number of conveying and kneading sections fairly evenly distributed along the length of the barrel. Kneading elements containing one, two, three or four tips are suitable, however, kneading elements from about 5 to about 30 mm wide having three tips are preferred. At recommended screw speeds of from about 100 to about 600 rpm and radial clearance of from about 0.1 to about 0.4 mm, these mixing extruders provide shear rates of at least from about 2000 sec$^{-1}$ to about 7500 sec$^{-1}$ or more. The net mixing power expended in the process including homogenization and dynamic vulcanization is usually from about 100 to about 500 watt hours per kilogram of product produced; with from about 300 to about 400 watt hours per kilogram being typical.

The process is illustrated by the use of W&P twin screw extruders, models ZSK-53 or ZSK-83. Unless specified otherwise, all of the plastic, rubber and other compounding ingredients except the cure activator are fed into the entry port of the extruder. In the first third of the extruder, the composition is masticated to melt the plastic and to form an essentially homogeneous blend. The cure activator (vulcanization accelerator) is added through another entry port located about one-third of the length of the barrel downstream from the initial entry port. The last two-thirds of the extruder (from the cure activator entry port to the outlet of the extruder) is regarded as the dynamic vulcanization zone. A vent operated under reduced pressure is located near the outlet to remove any volatile by-products. Sometimes, additional extender oil or plasticizer and colorants are added at another entry port located about the middle of the vulcanization zone.

The residence time within the vulcanization zone is the time a given quantity of material is within the aforesaid vulcanization zone. Since the extruders are typically operated under a starved condition, usually from about 60 to about 80 percent full, residence time is essentially directly proportional to feed rate. Thus, residence time in the vulcanization zone is calculated by multiplying the total volume of the dynamic vulcanization zone times the fill factor divided by the volume flow rate. Shear rate is calculated by dividing the product of the circumference of the circle generated by the screw tip times the revolutions of the screw per second by the tip clearance. In other words, shear rate is the tip velocity divided by the tip clearance.

Methods other than the dynamic curing of rubber/thermoplastic polymer resin blends can be utilized to prepare compositions. For example, the rubber can be fully cured in the absence of the thermoplastic polymer resin, either dynamically or statically, powdered, and mixed with the thermoplastic polymer resin at a temperature above the melting or softening point of the resin. If the cross-linked rubber particles are small, well dispersed and in an appropriate concentration, the compositions are easily obtained by blending cross-linked rubber and thermoplastic polymer resin. It is preferred that a mixture comprising well dispersed small particles of cross-linked rubber is obtained. A mixture which contains poor dispersed or too large rubber particles can be comminuted by cold milling, to reduce particle size to below about 50 μm, preferably below about 20 μm and more preferably to below about 5 μm. After sufficient comminution or pulverization, a TPV composition is obtained. Frequently, poor dispersion or too large rubber particles is obvious to the naked eye and observable in a molded sheet. This is especially true in the absence of pigments and fillers. In such a case, pulverization and remolding gives a sheet in which aggregates of rubber particles or large particles are not obvious or are far less obvious to the naked eye and mechanical properties are greatly improved.

In some embodiments, the TPV is made using a one step or two or more step compounding process. In one-step compounding using phenolic curatives, the compounding temperature preferably is maintained below 220° C. to avoid breaking down the phenolic curative agent. In two-step compounding, the phenolic curative agent is typically added during the second step and the temperature during the second step is maintained below 220° C.

Following are three brief exemplifications of processes for on-line branching of the thermoplastic polymer in combination with dynamic vulcanization:

Single Step: Charge a mixture of polypropylene (homopolymer or copolymer (either random polymer or impact copolymer), EPDM, stabilizer, processing aid, and ZnO, and halogen donor, such as tin dichloride. Add oil or meter in oil. The phenolic curative (such as SP1055 or SP1045) is fed via side arm feeder at a point along the extruder barrel such that all other ingredients have been intimately mixed. Alternatively, non halogenated phenolic curatives (such as SP1045) may be added in place of the halogen donor with the other ingredients. The halogen donor is then added downstream to the extruder via side feeder. Typical formulations to be used are described in Table 1. The extruder or mixer should be operated so that the temperature profile within the zones of the extruder preferably does not exceed 220° C. Proper mixing screw needs to be employed to allow homogeneous mixing in case of the extruder approach. Finally the melt is cooled and pelletized.

Two-Step In An Extruder: In this aspect a screw compounding extruder with a high aspect ratio and having two feed hoppers is utilized. Polypropylene (homopolymer or copolymer (random or impact copolymer)) is added through the first feeder. The temperature in the first section is maintained at 200° C. to 250° C. until the second feed hopper is reached. The temperature in the extruder adjacent the second feed hopper is lowered to between 190° C. and 220° C. At the second feed hopper EPDM, stabilizer, processing aid, filler and halogen donor are added. Subsequently, oil is metered in phenolic curative (SP1055 or SP1045) is added via side arm feeder. Again, non-halogenated phenolic curative can be exchanged for the halogen donator and the halogen donator exchanged for the non-halogenated phenolic curative during the mixing process. The final melt exiting the extruder is cooled and pelletized.

Single Step in a Mixer: In a mixer (for example a Brabender batch mixer) charge PP (homopolymer or copolymer (random or impact copolymer), EPDM, stabilizer and processing aid, and halogen donator. Add oil to the formulation and as torque increases and continue to mix for another 2 minutes Mix for approximately 2 minutes and add phenolic curative. Typical formulations are described in Table 1. Finally cool the melt and granulate.

Two-Step In A Mixer: In a mixer (for example a Brabender batch mixer) charge PP (homopolymer or copolymer (random or impact copolymer) and mix to a homogeneous melt at temperatures from 20° C. to 250° C. Cool the mixture down to approximately to 190° C. and add EPDM, stabilizer and processing aid. Add oil to the formulation and as torque increases and continue to mix for another 2 minutes. Mix for approximately 2 minutes and add phenolic curative. Finally cool the melt and granulate.

The TPV mixtures made using the one-step and two-step processes described above will have similar properties to those exemplified in the earlier examples.

In some embodiments, a thermoplastic vulcanizate composition comprises a mixture or reaction product of (1) a branched polypropylene having a branching index of less than 1.0; (2) an EPDM elastomer having ethylenic unsaturation; (3) an ethylene/α-olefin interpolymer disclosed herein; and a phenolic resin, wherein the branched polypropylene has a weight-average molecular weight in the range from about 100,000 to 1,000,000 and has a melt strength which is at least about 50% higher than that of a linear polypropylene having the same weight-average molecular weight.

TPV Applications and Articles

According to further embodiments, articles include a thermoplastic vulcanizate. The article may be made of the thermoplastic vulcanizate or may include one or more component including the thermoplastic vulcanizate. The thermoplastic vulcanizates according to embodiments may be used to prepare a variety of articles or manufacture, or their component parts or portions. The thermoplastic vulcanizates may be converted into a finished article of manufacture by any one of a number of conventional processes and apparatus. Illustrative processes include, but are not limited to, extrusion, calendering, compression molding, and other typical thermoset material forming processes.

Articles include, but are not limited to, sheets, foams, molded goods, and extruded parts. Additional articles include automotive parts, weather strips, belts, hoses, building profiles, wire and cable jacketing, flooring materials, gaskets, tires and tire components, computer parts, building materials and footwear components. A skilled artisan can readily augment this list without undue experimentation.

The article may include at least one component formed from a thermoplastic vulcanizate according to embodiments of this disclosure. Such articles include, but are not limited to, foams, weather strips, belts, hoses, wire and cable jacketing, tubes, flooring materials, gaskets, membranes, molded goods, extruded parts, and adhesives (for example, high viscosity adhesives). Additional articles includes polymer sheets, automotive parts (for example, tires and tire components), computer parts, building materials, household appliances, electrical supply housings, trash cans, garden hose, refrigerator gaskets, acoustic systems, utility cart parts, desk edging, and toys. The compositions can also be used in roofing applications, such as roofing membranes. The compositions can further be used in fabricating a footwear component, including, but not limited to, a shaft for a boot, particularly an industrial work boot. The compositions can also be used in fabricating automotive parts. A skilled artisan can readily augment this list without undue experimentation. Illustrative processes include, but are not limited to, extrusion, calendering, injection molding, compression molding, and other typical thermoplastic processes. For example, articles can be prepared by injection molding, extrusion, extrusion followed by thermoforming, low pressure molding, compression molding, and the like. The invention also provides an article comprising at least one component formed from an inventive composition. In a further embodiment, the article is a foamed profile extruded article. In a further preferred embodiment, the article is a weather-strip. In another embodiment, the article is an automotive part. In another embodiment, the article is a hose. In another embodiment, the article is a flooring material. In another embodiment, the article is a thermoplastic vulcanizate (TPV). In another embodiment, the article is a footwear component, such a shoe inner sole or shoe outer sole.

In embodiments, the article may be a foam including a TPV as previously described in this disclosure. In embodiments, the article may include at least one component formed from a foam formed from a TPV as previously described in this disclosure. In a further embodiment, the article may be a weather strip.

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

EXAMPLES

The present invention will be better understood by reference to the following examples, which are offered by way of illustration and which one skilled in the art will recognize are not meant to be limiting.

Gel Permeation Chromatography

Triple Detector GPC (TDGPC)

The chromatographic system consisted of a PolymerChar GPC-IR (Valencia, Spain) high temperature GPC chromatograph equipped with an internal IR5 infra-red detector (IR5) and 4-capillary viscometer (DV) coupled to a Precision Detectors (Now Agilent Technologies) 2-angle laser light scattering (LS) detector Model 2040. For all Light scattering measurements, the 15 degree angle is used for measurement purposes. The autosampler oven compartment was set at 160° Celsius and the column compartment was set at 150° Celsius. The columns used were 4 Agilent "Mixed A" 30 cm 20-micron linear mixed-bed columns and a 20-um pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration and calculation conventional molecular weight moments and the distribution (using the 20 um "Mixed A" columns) were performed according to the method described in [0002-0010] analogous to the Conventional GPC procedure.

The Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard (Mw/Mn>3) to the narrow standard column calibration results from the narrow standards calibration curve using PolymerChar GPCOne™ Software.

The absolute molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, NY (1987)) using PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight. The calculated molecular weights (using GPCOne™) were obtained using a light scattering constant, derived from one or more of the polyethylene standards mentioned below, and a refractive index concentration coefficient, dn/dc, of 0.104. Generally, the mass detector response (IR5) and the light scattering constant (determined using GPCOne™) should be determined from a linear standard with a molecular weight in excess of about 50,000 g/mole. The viscometer calibration (determined using GPCOne™) can be accomplished using the methods described by the manufacturer, or, alternatively, by using the published values of suitable linear standards, such as Standard Reference Materials (SRM) 1475a (available from National Institute of Standards and Technology (NIST)). A viscometer constant (obtained using GPCOne™) is calculated which relates specific viscosity area (DV) and injected mass for the calibration standard to its intrinsic viscosity. The chromatographic concentrations are assumed low enough to eliminate addressing 2nd viral coefficient effects (concentration effects on molecular weight).

The absolute weight average molecular weight ($MW_{(Abs)}$) is obtained (using GPCOne™) from the Area of the Light Scattering (LS) integrated chromatogram (factored by the light scattering constant) divided by the mass recovered from the mass constant and the mass detector (IR5) area. The molecular weight and intrinsic viscosity responses are extrapolated at chromatographic ends where signal to noise becomes low (using GPCOne™). Other respective moments, $Mn_{(Abs)}$ and $Mz_{(Abs)}$ are be calculated according to equations 1 and 2 as follows:

$$Mn_{(Abs)} = \frac{\sum_i IR_i}{\sum_i \left(\frac{IR_i}{M_{Absolute_i}}\right)} \quad (EQ\ 1)$$

$$Mz_{(Abs)} = \frac{\sum_i \left(IR_i * M_{Absolute_i}^2\right)}{\sum_i \left(IR_i * M_{Absolute_i}\right)} \quad (EQ\ 2)$$

Dynamic Mechanical Spectroscopy (DMS)

Small angle oscillatory shear (melt DMS) was performed using a TA Instruments ARES, equipped with "25 mm parallel plates," under a nitrogen purge. The time between sample loading, and the beginning of the test, was set to five minutes for all samples. The experiments were performed at 190° C., over a frequency range of 0.1 to 100 rad/s. The strain amplitude was adjusted, based upon the response of the samples from 1 to 3%. The stress response was analyzed in terms of amplitude and phase, from which, the storage modulus (G'), loss modulus (G"), dynamic viscosity η*, and tan delta were calculated. Specimens for Dynamic Mechanical Spectroscopy were "25 mm diameter×3.3 mm thick" compression molded discs, formed at 180° C., and 10 MPa molding pressure, for five minutes, and then quenched between chilled platens (15-20° C.) for two minutes. The rheology ratio (V0.1/V100 at 190° C.; also referred to as "RR") was recorded. A linear molecule (no detectable long chain branching) typically has a RR of 8 or less.

Differential Scanning Calorimetry (DSC)

Differential Scanning Calorimetry (DSC) is used to measure crystallinity in ethylene-based (PE) samples (including EPDM) and propylene-based (PP) samples. A sample (0.5 g) is compression molded into a film, at 25000 psi, 190° C., for a short time of approximately 10 seconds. About 5 mg to 10 mg of film sample is weighed and placed in a DSC aluminum pan. The aluminum lid is snuggly fitted on the pan to ensure good contact between the specimen and the top and bottom of pan. The sample pan is placed in a DSC cell, and then heated, at a rate of 10° C./min, to a temperature of 180° C. for PE, EPDM (230° C. for PP). The sample is kept at this temperature for five minutes. Then the sample is cooled at a rate of 10° C./min to −40° C. for PE, PP (−90° C. for EPDM), and kept isothermally at that temperature for five minutes. The sample is next heated at a rate of 10° C./min, past its complete melting temperature to 150° C. for PE and EPDM, and to 230° C. for PP (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)× 100 (for PE)).

Unless otherwise stated, melting point(s) ($T_m$) of each polymer is determined from the second heat curve, and the crystallization temperature ($T_c$) is determined from the first cooling curve.

Mooney Viscosity

Mooney Viscosity (ML1+4 at 125° C.) was measured in accordance with ASTM 1646, with a one minute preheat time and a four minute rotor operation time. The instrument is an Alpha Technologies Mooney Viscometer 2000.

The viscosity of each formulated compositions was measured using an uncured blanket (see experimental section), so that the viscosity of the uncured composition could be examined. Samples were conditioned for 24 hours at room temperature, prior to testing.

Mooney Scorch

Scorch properties of each composition was measured in accordance to ASTM D-1646, using an Alpha Technologies Mooney Viscometer 2000. Mooney viscometer was set at 125° C. The Mooney scorch values were reported for a small rotor, and represented the time to rise "x Mooney units" above the minimum viscosity (e.g. $t_5$ is a "five Mooney unit" increase in viscosity). The total test time was 30 minutes, with a 1 minute preheat time. The viscosities of the compositions were measured from uncured blanket, cured in the viscometer, so that the scorch properties could be examined. Samples were conditioned for 24 hours at room temperature, prior to testing.

MDR Analysis

MDR cure properties of each formulation are measured in accordance to ASTM D-3182, using an Alpha Technologies Rheometer MDR 2000. The MDR Test was carried out at 160° C. over a period of 30 minutes. The rheology of each formulated composition is measured from samples of uncured blanket, which is then cured during the MDR analysis. Samples are conditioned for 24 hours at room temperature, prior to testing. The visco-elastic properties, such as Mooney low, Mooney high, tan delta low, tan delta high, and time to reach a certain percentage of the cure state (for example, t95 corresponds to the time in minutes to reach the 95% state of cure), are measured during the cure cycle.

Unconfined Yield Strength

As used herein, "unconfined yield strength" is measured according to the following test. Pellets of a test polymer composition are coated by combining the pellets with 5000 ppm talc, based on the combined weight of the pellets and the talc. A sufficient amount of the coated pellets is loaded into a 2-inch diameter (ID) cylinder, with a height to diameter ratio of 2.5, such that the level of coated pellets is flush with the top of the cylinder (typically 100-120 grams coated pellets). The cylinder is made up of two halves held together, in the vertical dimension, by a hose clamp. The pellets are subjected to a consolidation stress of 195 lb/ft$^2$ at 37° C. (static oven, ambient atmosphere). A higher temperature setting of 42° C. is used for accelerated testing. The pellets remain under this consolidated stress for 2 weeks to 4 weeks. The cylinder is then removed from the oven; the consolidation load is removed, and the pellets (in the cylinder) are allowed to cool overnight in an environmental chamber set at a particular ambient temperature such as 0° C. or room temperature (RT; 22° C.) to obtain a final sample of consolidated pellets. The ambient temperature of the environmental chamber is also referred to as the "unloading temperature."

The cylinder is placed on the platform of an INSTRON 5543 single column tabletop tensile tester. The two halves of the split cylinder are separated after removing the hose clamp. If the pellets in the consolidated sample are totally free-flowing, the pellets will not hold the form of a cylinder and will simply collect into a pile. If the consolidated mass of pellets does hold the form of a cylinder, an INSTRON tester is used to measure the peak force required to crush the cylinder. The consolidated pellets are crushed using an INSTRON 5543 frame, to measure the maximum force required to break the "cylinder form" of the consolidated pellets. The consolidated pellets are positioned in the INSTRON tester in the vertical direction-longer dimension is the vertical direction. A constant strain rate of 2 mm/min is used for this test. To ensure data consistency, each composition (coated pellets) is measured twice, and the average is reported.

The unconfined yield strength (UYS) is calculated as the peak force (units of lb or kg) determined from the test previously described, divided by the cross-sectional area of the cylinder (in units of ft$^2$ or m$^2$). The UYS is an indication of blocking force, whereby the greater the UYS, the greater the blocking force. A zero value of UYS corresponds to free-flowing pellets.

Flowability

Flowability of the EPDM compositions is assessed from UYS measurements determined according to the procedure as previously described. A room-temperature flowability test is based on a UYS measurement conducted on a composition, in which the unloading temperature of the UYS determination procedure is room temperature (22° C.). Likewise, a 0° C. flowability test is based on a UYS measurement conducted on a composition, in which the unloading temperature of the UYS determination procedure is (0° C.).

For purposes of the flowability tests for the EPDM compositions of this disclosure, a composition having a UYS or less than or equal to 500 lb/ft$^2$ when the UYS is measured at an unloading temperature of 22° C. is determined to "Pass" a room-temperature flowability test. A composition having a UYS greater than 500 lb/ft$^2$ when the UYS is measured at an unloading temperature of 22° C. is determined to "Fail" the room-temperature flowability test. Similarly, a composition having a UYS or less than or equal to 1500 lb/ft$^2$ when the UYS is measured at an unloading temperature of 0° C. is determined to "Pass" a 0° C. flowability test. A composition having a UYS greater than 1500 lb/ft$^2$ when the UYS is measured at an unloading temperature of 0° C. is determined to "Fail" the 0° C. flowability test.

$^{13}$C NMR Method for EPDM Composition Analysis

The samples are prepared by adding approximately 2.6 g of a 50/50 mixture of tetrachloroethane-d2/orthodichlorobenzene containing 0.025 M chromium acetylacetonate (relaxation agent) to a 0.2-g sample in a 10-mm NMR tube. The samples are dissolved and homogenized by heating the tube and its contents to 150° C. The data are collected using a Bruker 400 MHz spectrometer, equipped with a Bruker Dual DUL high-temperature CryoProbe. The data is acquired using 160 scans per data file, a 6-second pulse repetition delay, with a sample temperature of 120° C. The acquisition is carried out using a spectral width of 25,000 Hz and a file size of 32,000 data points.

NMR spectral analyses of the composition of the examples are carried out using the following analysis method. Quantitation of monomers present in EPDM can be calculated using the following equations (1A through 9A).

The calculation of moles ethylene normalizes the spectral range from 55.0 ppm to 5.0 ppm to 1000 integral units. The contribution under the normalized integral area only accounts for 7 of the ENB carbons. The ENB diene peaks at 111 ppm and 147 ppm are excluded from the calculation due to concerns that double bonds may react at high temperatures.

$$\text{moles}Eth = \frac{(1000 - 3*\text{moles}P - 7*\text{moles}ENB)}{2} \quad \text{Equation 1A}$$

$$\text{moles}ENB = CH3(13.6 - 14.7\,\text{ppm}) \quad \text{Equation 2A}$$

$$\text{moles}P = CH3(19.5 - 22.0\,\text{ppm}) \quad \text{Equation 3A}$$

$$\text{mole \% ethylene} = \frac{100*\text{moles}E}{\text{moles}E + \text{moles}P + \text{moles}ENB} \quad \text{Equation 4A}$$

-continued $$\text{mole \% propylene} = \frac{100 * \text{moles}P}{\text{moles}E + \text{moles}P + \text{moles}ENB} \quad \text{Equation 5A}$$

$$\text{mole \% } ENB = \frac{100 * \text{moles}ENB}{\text{moles}E + \text{moles}P + \text{moles}ENB} \quad \text{Equation 6A}$$

$$\text{Wt \% ethylene} = \frac{100 * \text{mole \% } E * 28}{\text{mole \% } E * 28 + \text{mole \% } P * 42 + \text{mole \% } ENB * 120} \quad \text{Equation 7A}$$

$$\text{Wt \% propylene} = \frac{100 * \text{mole \% } P * 42}{\text{mole \% } E * 28 + \text{mole \% } P * 42 + \text{mole \% } ENB * 120} \quad \text{Equation 8A}$$

$$\text{Wt \% } ENB = \frac{100 * \text{mole \% } ENB * 120}{\text{mole \% } E * 28 + \text{mole \% } P * 42 + \text{mole \% } ENB * 120} \quad \text{Equation 9A}$$

Further NMR spectral analysis of some inventive interpolymers displays a peak area, from 21.3 ppm to 21.8 ppm (% PP Tacticity Marker), greater than 3.0% (further greater than 4.0%) of the total integral area from 19.5 ppm to 22.0 ppm. Similar spectral analysis of some comparative examples, show less than 3.0% of the total integral area from 19.5 ppm to 22.0 ppm. Spectral data are referenced to the EEE backbone at 30 ppm. Peak responses in this region have been typically related to differences in propylene tacticity incorporated into the polymer. A similar analysis can be done for another type of ethylene/α-olefin/non-conjugated polyene interpolymer.

Further NMR spectral analysis of some inventive EPDMs displayed a peak area (corresponding to $CH_3$ of the aliphatic chain end) from chemical shift region 14.0 to 14.3 ppm, which when the total integrated area (chemical shift region 1 to 55 ppm) is set to a value of 1000, integrates to a peak area greater than 0.5 (>0.5 chain ends per 1000 carbons, ACE). Similar spectral analysis of the comparative EPDMs showed less than 0.5 ACE or non detected of the total integral area from 10 to 55 ppm. Spectral data were referenced to the EEE backbone at 30 ppm. Peak responses in this region typically are related to differences in chain ends that have been incorporated into the EPDM. A similar analysis can be done for another type of ethylene/α-olefin/non-conjugated polyene interpolymer.

Compression Set

Compression set was measured according to ASTM D 395B, at test temperatures of −20° C., 23° C., 70° C., and 120° C. Pucks of 29 mm (±0.5 mm) were extracted from above injection molded plaques. For each sample, homogeneous four pucks (lacked notches, uneven thickness and inhomogeneity) were stacked, such that the total height was 12.5 mm (±0.5 mm), equating to compressive strain of 25%. Compression set was performed on two test specimens (four stacked pucks per specimen) for each test temperatures.

The stacked pucks were placed in the compressive device, and locked into place. The apparatus was then placed in an oven, or freezer, at the appropriate temperature, for the specified time (22 hrs for 23° C. and 70° C.; and 70 hrs for −20° C. and 120° C.). In this test, the stress was released at the test temperature, and the thickness of the sample was measured after a 30 minute equilibration period at room temperature.

Compression set is a measure of the degree of recovery of a sample following compression, and is calculated according to the equation CS=(H0−H2)/(H0−H1); where H0 is the original thickness of the sample, H1 is the thickness of the spacer bar used, and H2 is the final thickness of the sample after removal of the compressive force.

Stress-Strain Properties

Tensile properties were measured at room temperature following the method of ASTM D-412, on micro-tensile specimens that were die cut from the injection molded plaques. The tensile strain was calculated from the ratio of the increment of the length between clamps to the initial gauge length. The tensile stress was determined by dividing the tensile load by the initial cross section of the sample.

Representative Synthesis of Experimental EPDM by Continuous Polymerization

In general terms, it is desirable to produce the inventive polymer under the conditions as explained in U.S. Pat. Nos. 5,977,251 and 6,545,088, and the references therein. The polymer products were produced in a solution polymerization process using a continuously mixed loop reactor. The polymerization reaction was performed under steady state conditions, that is, constant reactant concentration and continual input of solvent, monomers, and catalyst, and constant withdrawal of unreacted monomers, solvent and polymer. The reactor system was cooled and pressurized to prevent formation of a vapor phase. Monomers: ethylene (CAS 74-85-1); propylene (CAS 115-07-1); 5-ethylidene-2-norbornene, ENB (CAS 16219-75-3).

Exemplary polymer compositions EDPM-01 and EPDM-02 were produced in a solution polymerization process using a continuous stir-tanked reactor followed by loop reactor. Ethylene was introduced in a mixture of a solvent of ISOPAR E (available from ExxonMobil), propylene was introduced and 5-ethylidene-2-norbornene (ENB) was introduced, each forming a reactor feed stream. Catalyst was fed to each reactor separately, and activated in-situ using Co-catalyst 1 and Co-catalyst 2.

The catalyst was {[[[2',2'''-[1,3-propanediylbis(oxy-kO)]bis[3-[3,6-bis(1,1-dimethylethyl)-9H-carbazol-9-yl]-5'-fluoro-5-(1,1,3,3-tetramethylbutyl)[1,1'-biphenyl]-2-olato-kO]](2-)]-hafniumdimethyl} CAS #1360629-63-5.

Cocatalyst-1 was a mixture of methyldi($C_{14-18}$ alkyl) ammonium salts of tetrakis(pentafluorophenyl)borate, prepared by reaction of a long chain trialkylamine (Armeen™ M2HT, available from Akzo-Nobel, Inc.), HCl, and Li[B($C_6F_5$)$_4$], substantially as disclosed in Example 2 of U.S. Pat. No. 5,919,988. Cocatalyst-1 was purchased from Boulder Scientific, and used without further purification.

Cocatalyst-2 was a modified methylalumoxane (MMAO), purchased from Akzo Nobel, and was used without further purification.

The outlet of each reactor was consequently a mixture of polymer, solvent, and reduced levels of the initial monomers. The outlet of the first reactor was fed directly into the second reactor (unless otherwise sampled). The polymer products from the first reactor are referred to here as EPDM-01-R1 and EPDM-02-R1. The polymer products from feeding EPDM-01-R1 and EPDM-02-R1 into the second reactor and further polymerizing under modified conditions were the final compositions EPDM-01 and EPDM-02, respectively. The molecular weights of the polymers were controlled by adjusting each reactor's temperature, monomer conversion, and/or the addition of a chain terminating agent such as hydrogen.

After polymerization, a small amount of water was introduced into the reactor exit stream as a catalyst kill, and the reactor exit stream was introduced into a flash vessel, in which the solids concentration was increased by at least 100 percent. A portion of the unreacted monomers, that is, ENB, ethylene, and propylene, and the unused diluent were then collected, and recycled back to the reactor feeds as appropriate.

Monomer feed ratios, polymerization temperatures, and polymerization temperatures for preparing EDPM-01-R1, EDPM-01, EPDM-02-R1, and EPDM-02 are listed in Table 1.

TABLE 1

| Polymer | Reactor Temp. [° C.] | Pressure [Psig] | Solvent/C2 Feed Ratio [w/w] | C3/C2 Feed Ratio [w/w] | ENB/C2 Feed Ratio [w/w] |
|---|---|---|---|---|---|
| EPDM-01-R1 | 109 | 775 | 0.1374 | 0.8750 | 0.1746 |
| EPDM-01 | 130 | 725 | 0.0342 | 0.9217 | 0.01787 |
| EPDM-02-R1 | 111 | 775 | 0.1374 | 0.8770 | 0.1845 |
| EPDM-02 | 130 | 725 | 0.0330 | 0.6489 | 0.01853 |

Feed rates, catalyst ratios, and catalyst efficiencies in the preparation of EDPM-01-R1, EDPM-01, EPDM-02-R1, and EPDM-02 are listed in Table 2.

TABLE 2

| Polymer | $H_2$ (mol %) | [C2] g/L | Catalyst Efficiency [lb poly/lb metal] × $1\,10^6$ | Borate/Cat. Metal Ratio [mol/mol] | Aluminum/Cat. Metal Ratio [mol/mol] |
|---|---|---|---|---|---|
| EPDM-01-R1 | 0.03 | 17.25 | 7.13 | 5 | 40 |
| EPDM-01 | 0.06 | 8.54 | 1.06 | 2 | 20 |
| EPDM-02-R1 | 0.03 | 16.22 | 5.9 | 5 | 40 |
| EPDM-02 | 0.06 | 8.54 | 1.09 | 2 | 20 |

From the two-reactor polymerization process as described, the total weight of the final polymer EPDM-01 consisted of 38 wt. % polymer product formed in the first reactor and 62 wt. % polymer product formed during the further polymerization of the first-reactor product in the second reactor. Likewise, the total weight of the final polymer EPDM-02 consisted of 41 wt. % polymer product formed in the first reactor and 59 wt. % polymer product formed during the further polymerization of the first-reactor product in the second reactor. The Polymers EDPM-01-R1, EDPM-01, EPDM-02-R1, and EPDM-02 were characterized according to the procedures previously described. The characterization data is provided in Table 3.

TABLE 3

| Polymer composition | Units | EPDM-01-R1 | EPDM-01 | EPDM-02-R1 | EPDM-02 |
|---|---|---|---|---|---|
| C2 | wt. % | 69.2 | 66.4 | 69.2 | 68.3 |
| C3 | wt. % | 26.9 | 29.3 | 26.9 | 27.1 |
| ENB | wt. % | 3.9 | 4.3 | 3.9 | 4.6 |
| Polymer Properties | | | | | |
| Mooney viscosity | MU | Not measured | 46 | Not measured | 48 |
| Mn (conv. GPC) | kg/mol | 164 | 121 | 164 | 115 |
| Mw (conv. GPC) | kg/mol | 360 | 298 | 360 | 285 |
| Mz (conv. GPC) | kg/mol | 685 | 589 | 685 | 560 |
| Mw/Mn | — | 2.19 | 2.47 | 2.19 | 2.47 |

Oil-extended EPDM compositions including polymers EPDM-01 and EPDM-02 were prepared and characterized as previous described. Additional EPDM compositions EPDM A, EPDM B, EPDM C, and EPDM D were characterized bases for comparison. EPDM A was Mitsui 3072, an oil-extended EPDM prepared by metallocene catalyst available from Mitsui Chemical. EPDM B was Nordel 4785, an EPDM composition available from Dow Chemical. EPDM C was Vistalon 3666, an oil-extended EPDM available from ExxonMobil. EPDM D was an oil-extended EPDM composition including a polymer prepared using an alternate catalyst system. Characterization data pertaining to the EPDM compositions is provided in Table 4.

TABLE 4

| | Comparative | | | | This Disclosure | |
|---|---|---|---|---|---|---|
| EPDM Polymer | EPDM A | EPDM B | EPDM C | EPDM D | EPDM 01 | EPDM 02 |
| C2 (wt. %) | 64 | 68 | 64 | 65 | 66 | 68 |
| C3 (wt. %) | 31.7 | 27.1 | 31.5 | 30.1 | 29.7 | 27.4 |
| ENB (wt. %) | 4.3 | 4.9 | 4.5 | 4.9 | 4.3 | 4.6 |
| Mw (kg/mol) | 215 | 179 | 394 | 341 | 298 | 285 |
| EPDM Composition Properties | | | | | | |
| EPDM Polymer (wt. %) | 70 | 100 | 57 | 57 | 70 | 70 |
| Oil (wt. %) | 30 | 0 | 43 | 43 | 30 | 30 |
| Mooney viscosity (ML1 + 4; 125° C.) | 50 | 85 | 55 | 55 | 48 | 47 |
| V0.1 (Pa · s) | 67,491 | 109,945 | 223,048 | 108,464 | 67,963 | 57,485 |
| V100 (Pa · s) | 2976 | 4975 | 2076 | 2959 | 2448 | 2537 |
| V0.1/V100 | 23 | 22 | 107 | 37 | 22 | 23 |
| Tan δ @ 0.1 rad/s 190° C. | 1.63 | 1.50 | 0.55 | 1.69 | 2.18 | 2.20 |
| Mw/V0.1 (g/mol/(Pa · s)) | 3.19 | 1.63 | 1.77 | 3.14 | 4.38 | 4.96 |
| Flowability Test (RT) | N/A | Fail | N/A | Fail | Pass | Pass |
| Flowability Test (0° C.) | N/A | Fail | N/A | Fail | Pass | Pass |

A thermoplastic vulcanizate (TPV) was prepared containing the oil-extended EPDM composition prepared from polymer EPDM-02. As a basis for comparison, a TPV was prepared containing the EPDM A composition. The TPVs were analyzed according to the procedures previously provided to determine physical characteristics such as hardness, tensile strength, elongation, modulus, tear, melt flow rate, and compression set. These characterizations are reported in Table 5. The TPV based on EPDM-02 was found to have significantly higher tensile strength, elongation, and melt flow rate.

TABLE 5

| EPDM Polymer Component of TPV | | Comparative EPDM A | EPDM 02 |
|---|---|---|---|
| Hardness (Shore A, 10 s delay) | Before aging | 68 | 69 |
| | After aging 150° C./168 h | 69 | 70 |
| Tensile strength (MPa) | Before aging | 4.3 | 5.8 |
| | After aging 150° C./168 h | 4.3 | 5.4 |
| Elongation at break (%) | Before aging | 193 | 241 |
| | After aging 150° C./168 h | 132 | 158 |
| 100% Modulus (MPa) | Before aging | 3.3 | 3.8 |
| | After aging 150° C./168 h | 3.8 | 4.2 |
| Tear (N/mm) | | 26.2 | 26.9 |
| Melt flow rate (g/10 min, 230° C., 10 kg) | | 2.5 | 3.9 |
| Compression set (%) | 23° C./22 h | 21 | 21 |
| | 70° C./22 h | 30 | 31 |
| | 100° C./22 h | 34 | 36 |
| | 125° C./70 h | 49 | 45 |

Exemplary formulations were prepared containing the oil-extended EPDM compositions based on polymers EPDM-01, EPDM-02, and comparative EPDM A. The exemplary formulations are provided in Table 6. Formulation 01 contained the composition based on EPDM-01. Formulation 02 contained the composition based on EPDM-02. The Comparative Formulation contained the composition based on comparative EPDM A.

TABLE 6

| Ingredient | Comparative Formulation | Formulation 01 | Formulation 02 |
|---|---|---|---|
| Comparative EPDM A | 140 | — | — |
| EPDM-01 | — | 140 | — |
| EPDM-02 | — | — | 140 |
| ZnO-80 | 3 | 3 | 3 |
| CB N 550 | 70 | 70 | 70 |
| Paraffinic oil, Sunpar 2280 | 35 | 35 | 35 |
| PEG 4000 | 3 | 3 | 3 |
| TMQ | 0.4 | 0.4 | 0.4 |
| ZMTI (ZMB2) | 0.6 | 0.6 | 0.6 |
| Luperox F40 | 6 | 6 | 6 |
| SR 517 | 3 | 3 | 3 |
| Total | 261 | 261 | 261 |

The formulations were characterized according to procedures provided previously in this disclosure. The MDR cure characteristics of the formulations are provided in Table 7. The Formulation 01 and Formulation 02 showed higher degrees of cure and faster cure rate than the Comparative Formulation.

TABLE 7

| Description | Units | Comparative Formulation | Formulation 01 | Formulation 02 |
|---|---|---|---|---|
| ML | dNm | 2.32 | 1.38 | 1.27 |
| MH | dNm | 12.49 | 14.76 | 13.33 |
| (MH − ML) | dNm | 10.17 | 13.38 | 12.06 |
| ts1 | min | 0.5 | 0.46 | 0.47 |
| ts2 | min | 0.67 | 0.62 | 0.63 |
| t95 | min | 5.35 | 6.71 | 5.19 |

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

For the purposes of describing and defining the present invention it is noted that the term "substantially" is used herein to represent the inherent degree of uncertainty that may be attributed to any quantitative comparison, value, measurement, or other representation. The term "substantially" is used herein also to represent the degree by which a quantitative representation may vary from a stated reference without resulting in a change in the basic function of the subject matter at issue. As such, it is used to represent the inherent degree of uncertainty that may be attributed to any quantitative comparison, value, measurement, or other representation, referring to an arrangement of elements or features that, while in theory would be expected to exhibit exact correspondence or behavior, may in practice embody something slightly less than exact.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A polymer composition comprising:
   an interpolymer of ethylene, an α-olefin, and a nonconjugated polyene; and
   from 25% to 35% by weight oil, based on the total weight of the polymer composition; wherein:
   the interpolymer comprises:
      from 66% to 75% by weight monomer units derived from ethylene, based on the total weight of the interpolymer; and
      from 3.5% to 5.5% by weight monomer units derived from the nonconjugated polyene, based on the total weight of the interpolymer;
   the interpolymer has:
      a weight-average molecular weight Mw from 250 kDa to 300 kDa; and
      a polydispersity index from 2.0 to 3.5;
   the polymer composition has:
      a Mooney viscosity [ML (1+4); 125° C.] from 40 to 55;
      a rheology ratio $V_{0.1}/V_{100}$ from 20 to 25, where
         $V_{0.1}$ (low-shear viscosity) is the viscosity of the polymer composition measured at 190° C. at a frequency of 0.1 radians/second and $V_{100}$ is the viscosity of the polymer composition measured at 190° C. at a frequency of 100 radians/second;
      a ratio of the weight-average molecular weight Mw to the low-shear viscosity $V_{0.1}$ of the polymer composition, $Mw/V_{0.1}$, from 4.0 to 5.0 (g/mol)/(Pa·s); and
      a tan δ at 0.1 rad/s and 190° C. from 2.1 to 2.3; and
   pellets formed from the polymer composition and coated with 5000 ppm talc filler, based on a combined weight of the pellets and the talc filler, have an unconfined yield strength (UYS) of:
      less than 500 lb/ft$^2$ when UYS is measured at an unloading temperature of 22° C.; and
      less than 1500 lb/ft$^2$ when UYS is measured at an unloading temperature of 0° C.

2. The polymer composition of claim 1, wherein the α-olefin is a $C_3$-$C_{20}$ α-olefin.

3. The polymer composition of claim 1, wherein the interpolymer is an EPDM terpolymer.

4. The polymer composition of claim 1, wherein the α-olefin is propylene and the nonconjugated polyene is selected from the group consisting of 5-ethylidene-2-norbornene, dicyclopentadiene, vinylnorbornene, and 1,5-hexadiene.

5. The polymer composition of claim 1, wherein the α-olefin is propylene and the nonconjugated polyene is 5-ethylidene-2-norbornene.

6. The polymer composition of claim 1, wherein the oil is chosen from petroleum oils, polyalkylbenzene oils, and organic acid monoesters, and combinations thereof.

7. The polymer composition of claim 1, wherein:
   the α-olefin is propylene;
   the nonconjugated polyene is 5-ethylidene-2-norbornene;
   the polymer composition has a Mooney viscosity from 45 ML (1+4) at 125° C. to 55 ML (1+4) at 125° C.;
   the interpolymer comprises:
      from 68% to 75% by weight monomer units derived from ethylene, based on the total weight of the interpolymer; and the polymer composition has:
a low-shear viscosity $V_{0.1}$ greater than 50,000 Pa·s and less than 70,000 Pa·s.

8. The polymer composition of claim 1, wherein the interpolymer has a weight-average molecular weight Mw from 265 kDa to 300 kDa.

9. A thermoplastic vulcanizate composition comprising:
the polymer composition according to claim 1;
a thermoplastic polymer; and
a vulcanization agent.

10. An article comprising at least one component comprising a thermoplastic vulcanizate composition according to claim 9.

11. The article of claim 10, wherein the article is selected from the group consisting of profiles, injection molded parts, gaskets, shoe components, tubes, automotive hoses, automotive belts, weather strip profiles, architectural profiles, roofing membranes, injection molded articles, general purpose rubber goods, tires, impact modification, and TPE compounds.

12. The article of claim 10, wherein the article is a weather strip.

* * * * *